United States Patent
Chan et al.

[11] Patent Number: 5,937,077
[45] Date of Patent: Aug. 10, 1999

[54] IMAGING FLAME DETECTION SYSTEM

[75] Inventors: William S. Chan, San Pedro; John W. Burge, Santa Monica, both of Calif.

[73] Assignee: General Monitors, Incorporated, Lake Forest, Calif.

[21] Appl. No.: 08/637,557

[22] Filed: Apr. 25, 1996

[51] Int. Cl.[6] ......................................................... G06K 9/46
[52] U.S. Cl. ........................ 382/100; 382/203; 340/578; 250/339.15
[58] Field of Search .................................... 382/100, 180, 382/203; 348/161, 143, 152, 164; 340/577, 578, 584, 587, 588; 250/339.15; 169/61

[56] References Cited

U.S. PATENT DOCUMENTS

| | | | |
|---|---|---|---|
| 4,074,225 | 2/1978 | Vandeweghe | 340/237 R |
| 4,112,463 | 9/1978 | Kamin | 355/105 |
| 4,257,063 | 3/1981 | Loughry et al. | 358/108 |
| 4,408,224 | 10/1983 | Yoshida | 358/108 |
| 4,520,390 | 5/1985 | Paredes et al. | 358/108 |
| 4,597,451 | 7/1986 | Moore et al. | 169/61 |
| 4,697,172 | 9/1987 | Kimura | 340/587 |
| 4,750,142 | 6/1988 | Akiba et al. | 364/550 |
| 4,775,853 | 10/1988 | Perez Borruate | 340/521 |
| 4,907,281 | 3/1990 | Hirvonen et al. | 382/100 |
| 4,909,329 | 3/1990 | Yoshida et al. | 169/61 |
| 5,059,953 | 10/1991 | Parsons et al. | 340/578 |
| 5,153,772 | 10/1992 | Goedeke et al. | 358/108 |
| 5,201,011 | 4/1993 | Bloomberg et al. | 382/175 |
| 5,289,275 | 2/1994 | Ishii et al. | 340/578 |
| 5,510,772 | 4/1996 | Lasenby | 340/578 |
| 5,592,151 | 1/1997 | Rolich | 340/584 |
| 5,677,532 | 10/1997 | Duncan et al. | 250/339.15 |

OTHER PUBLICATIONS

Gonzalez et al. *Digital Image Processing.* Addison–Wesley. 1992, pp. 41–43.

*Primary Examiner*—Jon Chang
*Attorney, Agent, or Firm*—Larry K. Roberts

[57] ABSTRACT

An imaging flame detection system for detecting flames of fires against false alarms using continuous imaging and pattern recognition of infrared (IR) images of a protected area under surveillance by the system. The system uses a Silicon (Si) Charge-Coupled-Device (CCD) array to detect the IR images, which first have passed through a wide field of view lens to establish a wide surveillance of the protected area, and have been filtered by a narrow band IR filter centered at 1,140 nm wavelength to remove false alarms originated from background sources of the protected area. Then, the system digitizes and thresholds these images into binarized images for pattern recognition to remove any remaining false alarms. To accomplish this function, this process forms blobs of suspect flames from the binarized images, extracts from these blobs characteristic parameters for statistical evaluation of the suspect blobs, matches these parameters with those stored in a system database to establish a vote for a flame or a false alarm, and then declares the suspect blob as a flame when the voting value exceeds an empirically-determined threshold. On a conclusive declaration, the system automatically activates a warning for suppressant release to put out the flame.

26 Claims, 7 Drawing Sheets

Lookup Table

A/B Ratio Difference

Frame Difference

Fig. 13

Proportion of Historical Observations in Which This Data Cell Was Obtained When Flame Was Observed Example Entry Proportion of Historical Observations in Which This Data Cell Was Obtained When False Alarm Was Observed

Fig. 14

IMAGING FLAME DETECTION SYSTEM

TECHNICAL FIELD OF THE INVENTION

This invention is in the field of fire detection systems, particularly in systems for detecting and discriminating flames of fires from false alarms.

BACKGROUND OF THE INVENTION

Fire detection systems are widely used today in many environments, particularly those have a high risk of hydrocarbon fires, such as petrochemical plants and off-shore oil rigs. In these environments, the systems must detect a fire rapidly, discriminate it from false alarms conclusively, trigger an alarm automatically and release suppressant reliably to control it quickly, so that no lives are lost and no properties are damaged. All commercially-available systems using simple determination of fire energy for detection suffer in varying degree from false alarms, poor reliability and slow response, each causes untimely suppressant release proved costly and hazardous to the user. Many industries need a more sophisticated system which eliminates or significantly reduces false alarms by discriminating the flame from false alarms originated from all sources, rapidly and reliably, while at the same time being affordable to the user. This invention is such a system capable of imaging the flame and using its spectral, spatial and temporal characteristics to discriminate it from false alarms.

SUMMARY OF THE INVENTION

An imaging flame detection system to discriminate flames from false alarms is described. The system includes an IR camera apparatus, a pattern recognition apparatus and an activator apparatus. The infrared (IR) camera apparatus sensitive to near IR provides surveillance of the protected area continuously, during which it detects IR images of the protected area and passes them onto the pattern recognition apparatus for further processing. The pattern recognition apparatus then extracts parameters from these images for detecting flames and removing false alarms at the same time by using a combination of spectral filtering, pattern recognition and characteristic parameter matching.

In an exemplary embodiment, the IR camera apparatus includes a two-dimensional (2-D), CCD array apparatus and an optical apparatus. The CCD array apparatus containing 510 columns by 492 rows of Si pixels (detectors) detects the IR images. The optical apparatus comprising a wide field-of-view lens and a narrow-band IR filter focuses and filters the IR from a wide area onto the CCD array apparatus.

The pattern recognition apparatus includes an A/D converter apparatus and a field programmable gate array (FPGA) apparatus. The A/D converter apparatus converts analog images from the IR camera into digital images. The FPGA apparatus performs all data processing for the system, which includes thresholding images, forming blobs of suspect flames, extracting characteristic parameters for statistical evaluation, matching parameters for flame identification, declaring a suspect blob a flame, and activating alarm for suppressant release to put out the flame.

The activator apparatus switches on the alarm, warning light, system health light and suppressant release.

In accordance with a further aspect of the invention, a method is described for detecting and discriminating flames against false alarms which includes the following steps:

forming 2-D images in a narrow IR band for eliminating background false alarms;

digitizing 2-D images at 30 frames/s for fast detection and discrimination;

thresholding digital images into binary form for reducing data processing;

finding runs, blobs, MBR and A/B ratio for characterizing flames and false alarms;

extracting characteristic parameters for statistical evaluation of suspect blobs;

matching these parameters with those in a data-base for voting a flame or a false alarm; and declaring a suspect blob as a flame when the voting value exceeds an empirically-determined threshold for activating the alarm.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Overview of the Flame Detection System

Figure 1:
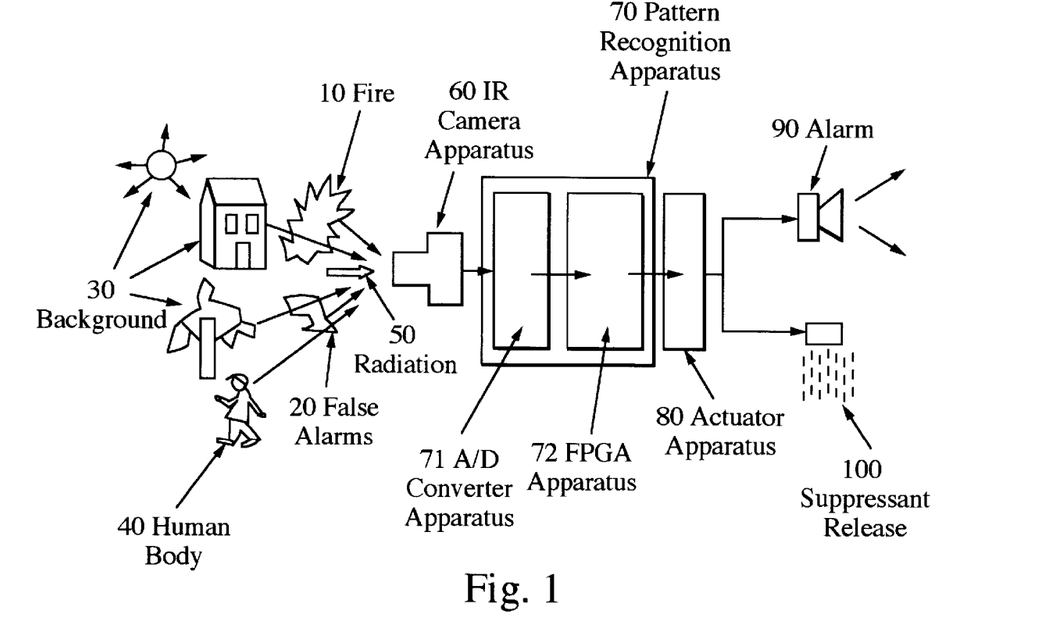
FIG. 1 is a block diagram of the imaging flame detection system.

FIG. 1 shows an overview of an imaging flame detection system in accordance with the invention. In a general sense, the system performs two basic functions: detecting the flame of a fire and discriminating it from false alarms. The system front end is an IR camera apparatus 60 sensitive to IR radiation, which comes from many sources within the field of view of the IR camera apparatus 60, such as the IR sources 30 illustrated in Fig.1.

Figure 2:
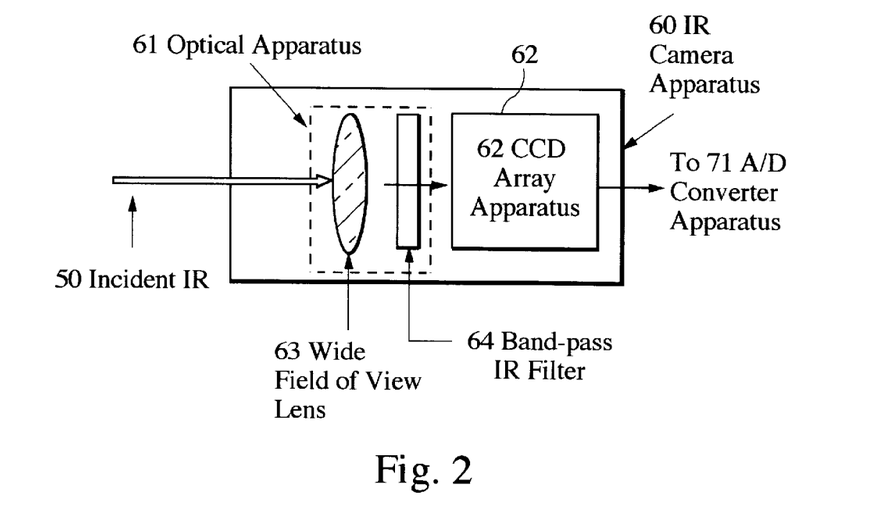
FIG. 2 is a block diagram of the IR camera apparatus.

The IR camera apparatus 60, shown in FIG. 2, includes an optical apparatus 61 and a CCD array apparatus 62. The optical apparatus 61 includes a wide field-of-view lens 63 and a narrow bandpass IR filter 64. The wide field-of-view lens 63 focuses the IR 50 from the wide surveillance area onto the CCD array apparatus 62, while the narrow bandpass IR filter 64 filters this IR to remove the undesirable false alarm sources. The camera apparatus 60 then transfers the resultant images into an A/D converter apparatus 71 which digitizes them for pattern recognition processing.

A thresholding apparatus 73, the first stage of the FPGA apparatus 72 shown in FIG. 3, binarizes the digital images from the A/D converter apparatus 71, by accepting pixel values greater than or equal to a predetermined threshold and rejecting those below that value. The binarized pixels pass into a feature extraction apparatus 74 to be resolved into "blobs", each of which is a maximal collection of adjacent white pixels (those equal to or exceeding the threshold). The feature extraction apparatus 74 divides the number of pixels in the blob by the area of the smallest rectangle which includes every pixel in the blob (the result is called the A/B ratio). It then extracts from the A/B ratio data two parameters, A/B ratio difference and frame difference, to decide whether these parameters are characteristic of flame or a false alarm. This decision process performed by the decision making apparatus 75, the last stage of FPGA apparatus 71, uses these parameters to access a database obtained by processing images of known flames and known false alarms in order to update an estimate that flame is present in the succession of images. Once a flame match is thus established, the decision making apparatus 75 sends an alarm signal to the activator apparatus 80 for alarm activation and suppressant release.

IR Camera Apparatus 60

Referring to FIG. 2, the JR camera apparatus 60 includes an optical apparatus 61 and a two-dimensional (2-D) CCD array apparatus 62. The optical apparatus 61 includes a wide field-of-view lens 63 and a narrow bandpass IR filter 64. During the 24-hour surveillance of the protected area, the IR camera apparatus 60 records IR images of the area continuously. Working in concert, the IR filter 64 and the CCD array apparatus 62 reject many false alarms by filtering the undesirable background sources 30, and then transfer the filtered images automatically to the pattern recognition apparatus 70 for pattern recognition processing to remove all remaining false alarms that had not been rejected by the IR camera 60.

Optical Apparatus 61

The wide field-of-view lens 62 of the optical apparatus 61 in an exemplary embodiment provides a 110-degree surveillance of the protected area. Fabricated with an optical material to pass only visible and near IR, it also rejects false alarms due to ultraviolet and long IR sources.

The filter 63 with a bandpass centered at 1,140 nm and a bandwidth of 17 nm will remove those false alarms arising from ultraviolet sources such as the sun, lightning and welding, and from IR sources with wavelength longer than 1,140 nm such as sun reflections, reflections from ocean, buildings, trees, human bodies, head lamps, automobiles and other objects that have nothing to do with fires. However, this filter will pass sufficient JR emitted from flames so that their spatial, spectral and temporal characteristics will remain intact and be imaged clearly by the CCD array apparatus 62.

CCD Array Apparatus 62

A CCD array apparatus 62 made of Si is purposely employed in the preferred embodiment, in accordance with an aspect of the invention, to provide sufficient sensitivity for capturing 2-D images of flames at 1,140 nm but not enough for detecting background sources that emit IR beyond 1,140 nm. In this way, the insensitivity of the CCD array apparatus 62 will reject, before a single processing step is made, most false alarms arising from background sources rich in long wavelength IR, such as sun-heated buildings, human bodies, heated pipes and sun reflection by ocean surfaces. Due to its high spatial resolution of 510×492 pixels in one exemplary embodiment, the CCD array apparatus 62 will provide a well-defined spatial extent of a flame occupying at least ten pixels even when the flame of a 1 square-foot fire is at 50 feet away from the IR camera apparatus 60. This spatial extent is more than sufficient to remove the remaining false alarms by pattern recognition processing in accordance with the invention.

Exemplary hardware suitable for the purpose of the wide field of wide lens 63 (Marshall, 3 mm C-mount imaging lens), narrow bandpass filter 64 (Spectrogon, NB-1140-017-B) and CCD array apparatus 62 (Sony, CCB-M35A/Mono) are available commercially from vendors.

Pattern Recognition Apparatus 70

Figure 3:
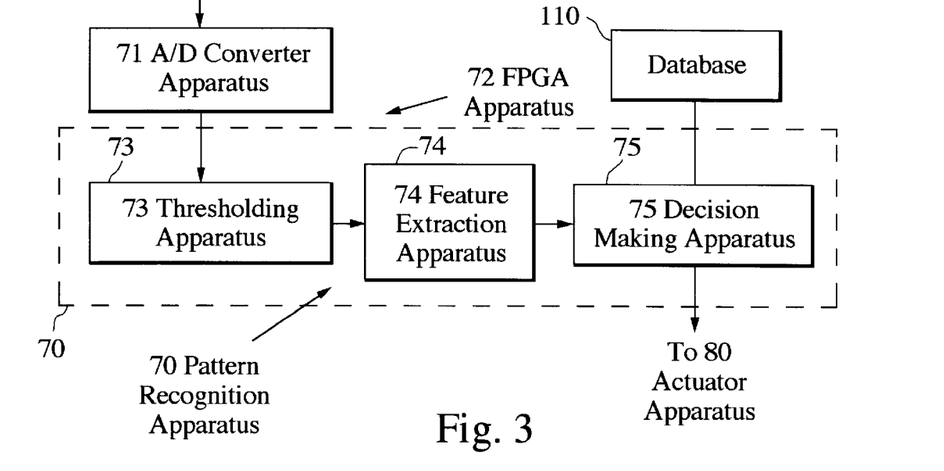
FIG. 3 is a block diagram of the pattern recognition apparatus and FPGA apparatus.
Figure 4:
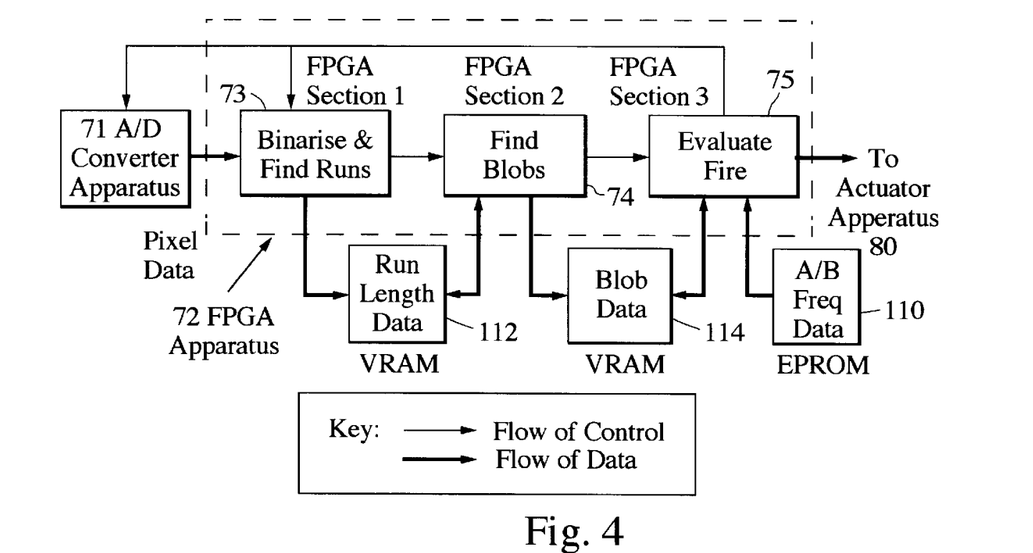
FIG. 4 is a block diagram of the hardware implementation of the pattern recognition apparatus.

Referring to FIG. 3, the pattern recognition apparatus 70 includes an A/D converter apparatus 71 and a FPGA apparatus 72, with the latter shown in FIG. 4 in three sections.

The pattern recognition apparatus 70: (1) thresholds pixel values greater than or equal to a predetermined threshold and rejects those below that value to reduce data processing; (2) forms connecting regions of accepted pixels that are adjacent to identify blobs of hot spots; (3) extracts characteristic parameters of blobs from adjacent image frames to recognize a suspect flame; (4) matches the parameters of a suspect blob with those stored in a system database 110 to establish a vote for a flame or a false alarm; (5) declares the suspect blob as a flame when the voting value exceeds an empirically-determined threshold value; and (6) activates a signal sent to the activator apparatus 80 to release the suppressant.

A/D Converter Apparatus 71

The A/D converter apparatus 71 with an exemplary 8-bit resolution digitizes the analog signals from the IR camera 60 at a speed sufficient to digitize every pixel of all 30 frames in each second, thus preparing the data for pattern recognition processing by the FPGA apparatus 72. The 8-bit resolution is capable of providing 256 gray levels of the digitized signal, so that the system can select any one of the 256 levels as threshold, depending on the flame type and the background false alarms.

FPGA Apparatus 72

As shown in FIG. 3, the FPGA apparatus 72 includes a thresholding apparatus 73, a feature extraction apparatus 74 and a decision making apparatus 75. The apparatus 70 is designed to have sufficient speed and associated memory to perform the entire pattern recognition processing continuously throughout surveillance on a virtually real time basis.

The FPGA apparatus 72 performs all data processing for the entire system, which includes thresholding images, forming blobs of suspect flames, extracting characteristic parameters for statistical evaluation, matching parameters for discriminating votes, declaring a suspect blob a flame instead false alarm, and activating alarm for suppressant release to put out the flame.

Thresholding Apparatus 73

The thresholding apparatus 73 in the FPGA apparatus 72, as shown in FIG. 4, binarizes digital images from the A/D converter apparatus 71, thus reducing the amount of data that must be transmitted through the system and simplifying the processing of that data. In the binarization process, the IR level of each pixel, represented by 8 bits by the A/D converter apparatus 71, is now represented by 1 bit passing through the thresholding apparatus 73. A pixel is "white" when its value is greater or equal to the threshold value, otherwise it is "black", so a binarized image contains only white and black pixels.

Feature Extraction Apparatus 74

Figure 5:
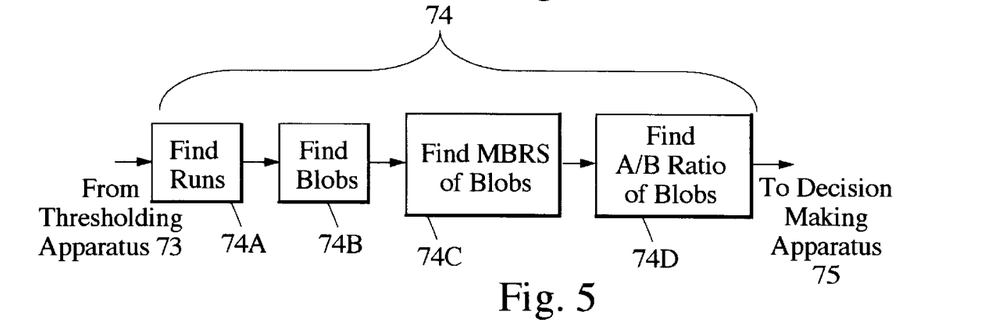
FIG. 5 is a block diagram of the feature extraction apparatus.

Shown in the functional block diagram of FIG. 5, the feature extraction apparatus 74 finds: runs (function 74A), blobs (function 74B), the minimum bounding rectangle (MBR) of the blob (function 74C), and A/B ratio of blobs (74D). The binarized pixels from the thresholding apparatus 73 are passed into a feature extraction apparatus 74 to be resolved into blobs, each of which is a maximal collection of adjacent white pixels.

Figures 6A, 6B:
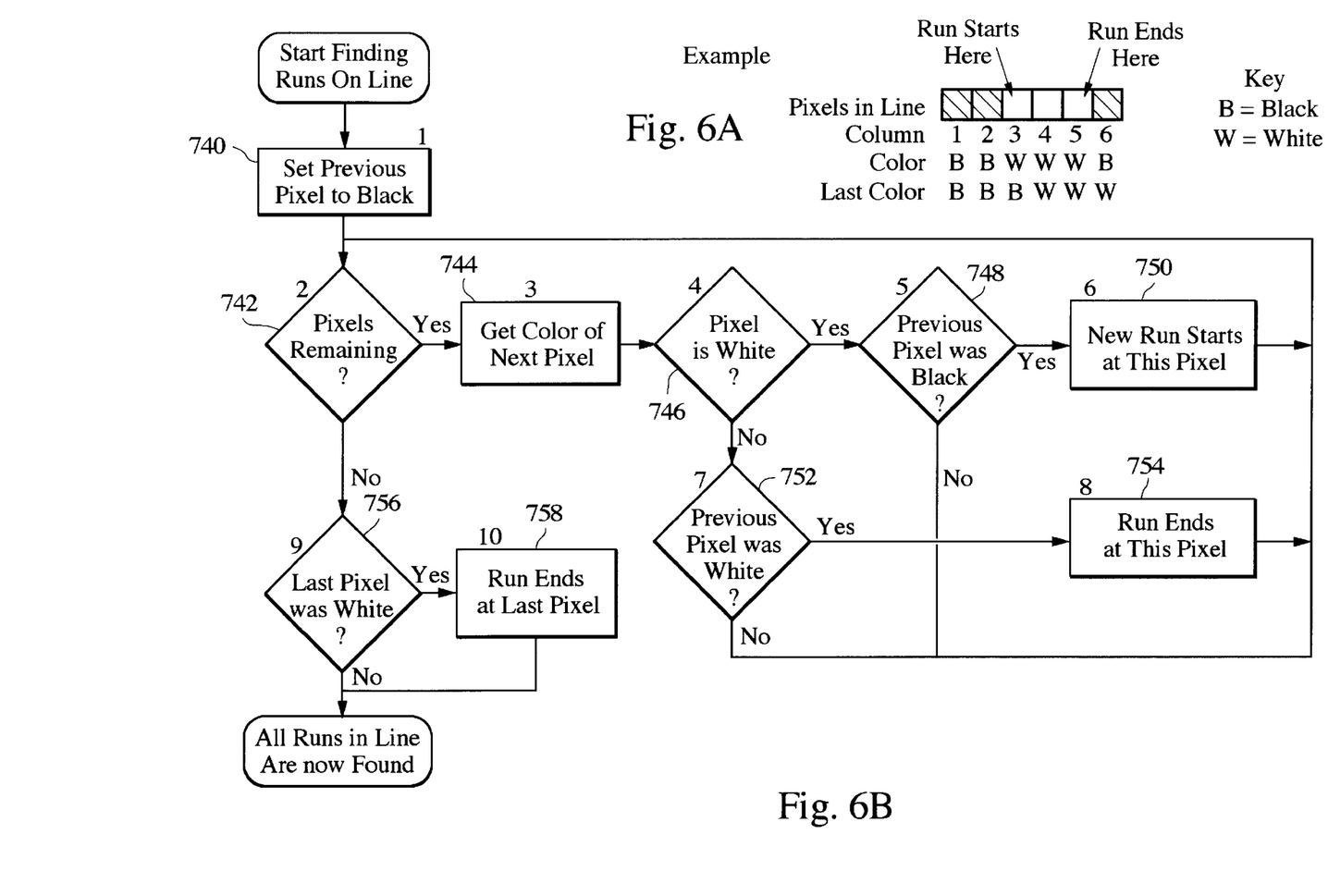
FIG. 6A shows an exemplary line of sensor data.
FIG. 6B is a flow diagram of an exemplary method for finding the runs in a row.

The initial stage of resolving binarized pixels into blobs is to examine each row of the image for sequences of adjacent white pixels called "runs". An exemplary method for finding the runs in a row (function 74A) is illustrated in FIGS. 6A and 6B, and is described as follows. Examined from left to right, a run starts when a white pixel is found with a black pixel before it and continues until either a black pixel is found or the line ends. As each pixel is examined, the feature extraction apparatus 74 compares its color with that of the pixel before it. In step 740, although no pixel have yet been examined, the color of the previous pixel is assumed Black. (This is so that if the first pixel on the line happens to be white, step 748 will detect the beginning of a run.) Step 742 test whether there are any more pixels remaining in the row to be examined. If so ("Yes"), step 744 gets the color of the next pixel, which is pixel #1 at the beginning of the line. In the example depicted in FIG. 6A, step 744 finds that pixel #1 is Black. Step 746 then tests the pixel to see if it is White; for this example, it is not ("No"), which leads to step 752. Step 752 checks if the previous pixel was White, but in this example it was Black, and the "No" exist directs processing back to Step 742. The process is now repeated for pixel #2. Again, pixel #2 is Black, so the feature extraction apparatus 74 repeats step 744, 746 and 748, and back to step 742. But when step 744 examines the color of pixel #3, it is White (step 746). The previous pixel was Black (step 748), so a run has now started (step 750).

Referring to FIG. 6A, Pixels #1 and #2 were both Black. Pixel #3 is White, and its previous pixel (#2) was Black. In preparation for the next pixel, the feature extraction Apparatus 74 returns to step 742. Step 742 finds again that there are remaining pixels to be examined, and checks the color of the next pixel, #4, which is White. Step 748 now finds that the previous color was not Black (it was White), and takes the "No" exit back to step 742 to examine the next pixel. Step 742 checks that there are pixels remaining, and step 746 finds the color of pixel #5. Again, this is White (Step 4) and the pixel was White (Step 5), returning to Step 742. Step 742 finds that pixel #6 remains to be examined. Step 744 gets its color, Black. Step 746 tests to see if it is White; here it is not. Step 752 tests whether the previous pixel was White; here it was. Step 754 notes that the run has ended. Returning to step 742, there are no pixels remaining to be examined. Step 756 tests whether the last pixel was White. If it had been, Step 758 would have noted that the run has ended on the last pixel of the line, but in this case, it is not.

Figures 7, 8:
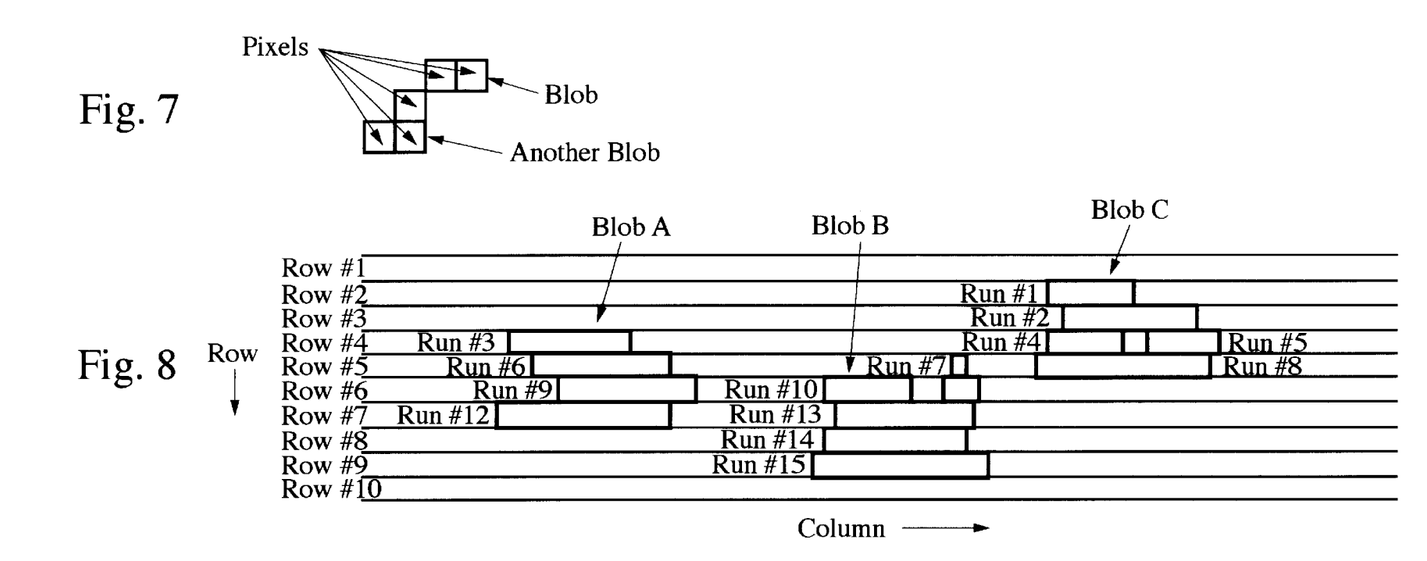
FIG. 7 illustrates the composition of pixels into blobs.
FIG. 8 shows the composition of blobs from runs.
Figure 9:
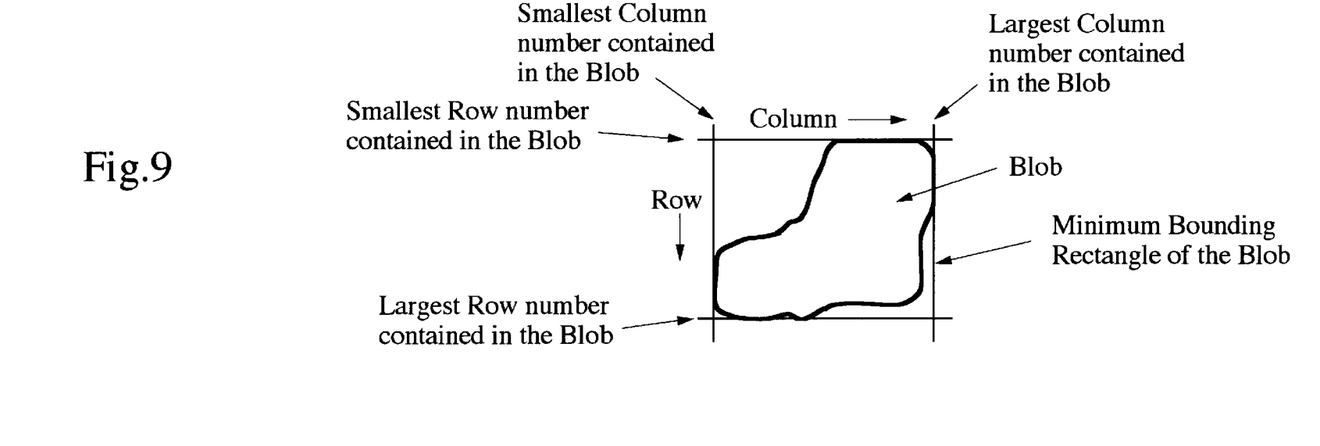
FIG. 9 describes the minimum bounding rectangle of a blob.
Figure 10:
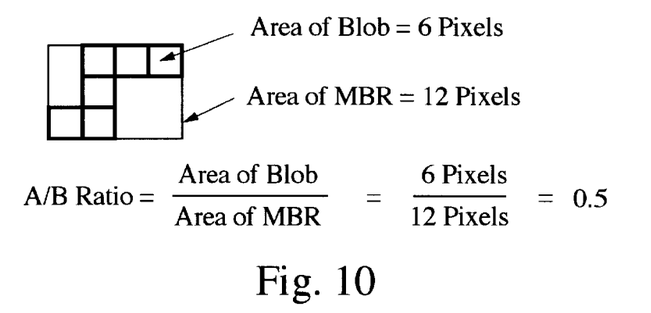
FIG. 10 shows the calculation of the A/B ratio of a blob.

The column containing the first pixel of the run (start column), the number of pixels in the run (length) and the row containing the run are found and stored for the duration of processing of the frame. These data are used to form collections of runs such that runs in adjacent rows "overlap" in that they share at least one column, as illustrated in FIG. 8. Subsequently, the feature extraction includes determining the ratio between the number of pixels in the blob (the area of the blob, A) and the area of the smallest rectangle which includes every pixel in the blob, the MBR (B) of the blob. This measure is called the A/B ratio of the blob. The area of the blob is determined by summing of the lengths of the runs in the blob. The MBR is found by determining the smallest and greatest row and the smallest and greatest column found in any of the runs in the blob, as illustrated in FIG. 9. The calculation of the A/B ratio is illustrated in FIG. 10. If analysis of the preceding image frame has identified any blobs as due to a false alarm source, their stored MBR's are compared with those of each blob in the frame undergoing analysis. Every blob whose MBR coincides with or falls within the MBR of any false alarm blob from the previous frame is not further analyzed.

No data is retained from any frame except the frame immediately preceding the one currently under analysis. All data relating to each blob is passed from frame to frame as it is re-identified in each succeeding frame. If a blob from the previous frame cannot be identified in the current frame, all its data are discarded, whether it has been identified as due to a false alarm source or not.

Figure 11:
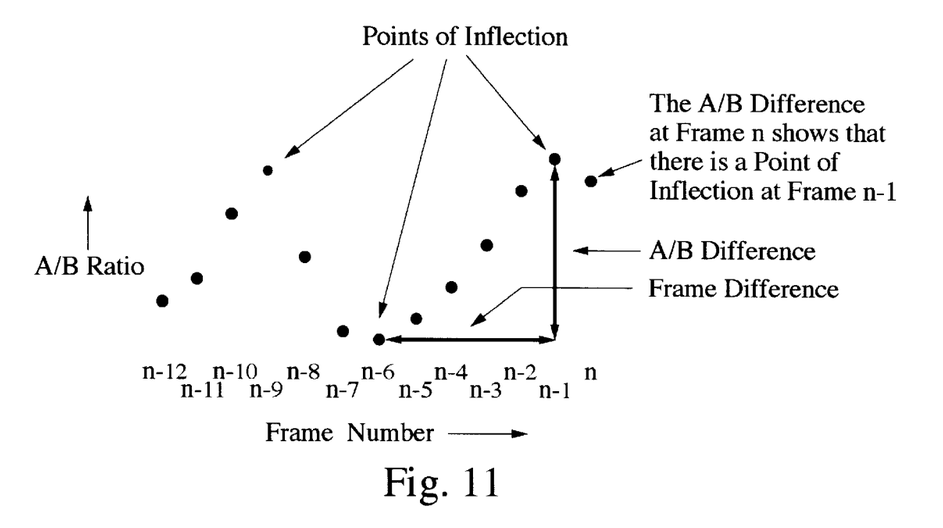
FIG. 11 explains the A/B difference and frame difference between points of inflection.

In the flame discrimination process, it is the temporal profile of the A/B ratio and not the ratio per se that is used. An example of the temporal profile of the A/B ratio of a flame is shown in FIG. 11. This profile is the A/B ratio of a flame (or a false alarm) blob tracked across successive frames. From this temporal profile, three important parameters characteristic of a flame (or a false alarm) are determined: (1) point of inflection, (2) A/B ratio difference between adjacent points of inflection, and (3) frame difference between adjacent points of inflection. FIG. 11 illustrates the points of inflection and the calculation of A/B difference and frame difference between adjacent inflections. The use of these characteristic parameters for flame discrimination against false alarms is described in detail below.

Decision Making Apparatus 75

Figure 12:
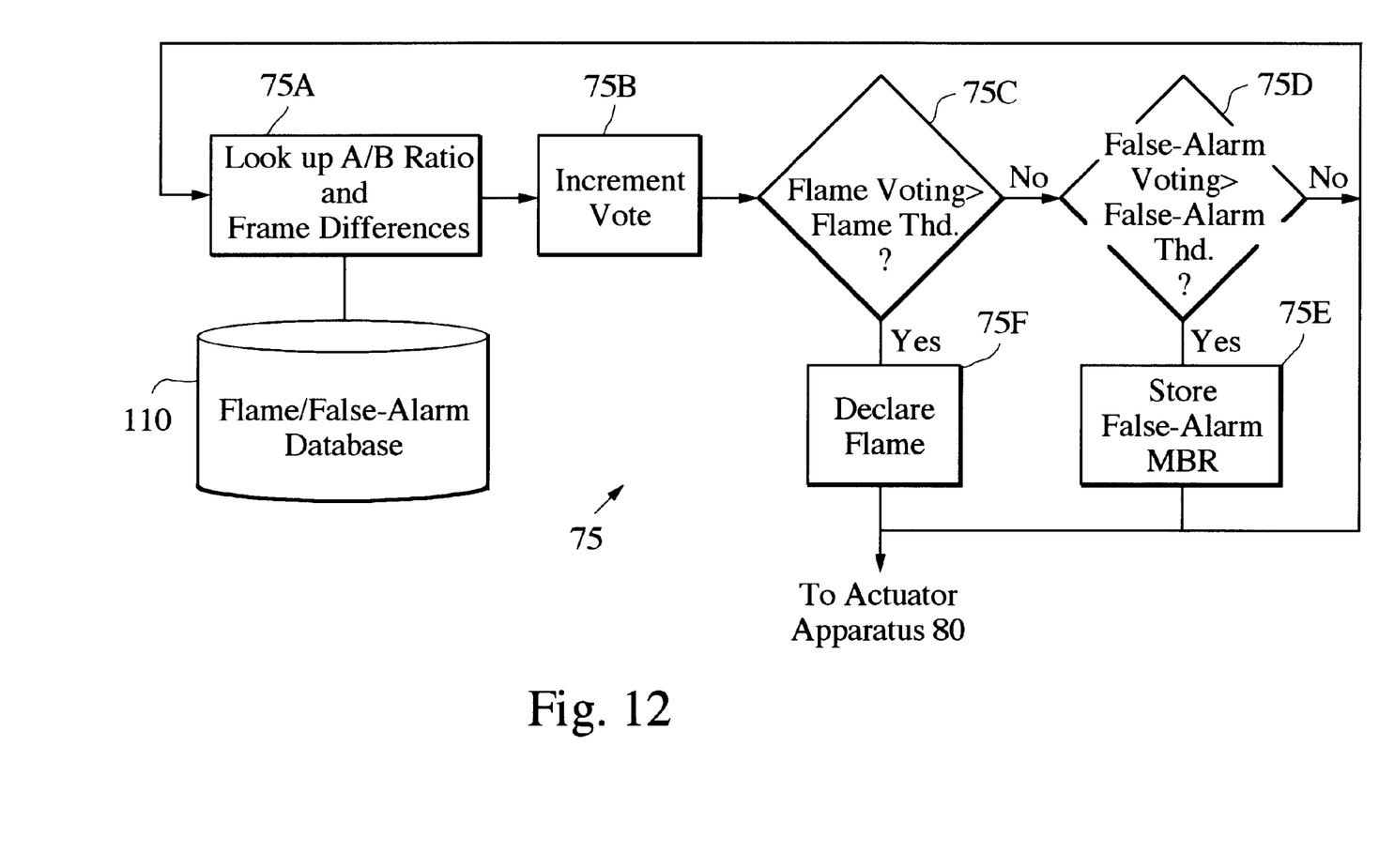
FIG. 12 is a block diagram of an exemplary decision making apparatus.

Outlined in functional flow diagram form in FIG. 12, the decision making apparatus 75 uses the characteristic parameters, A/B ratio difference and frame difference, of the IR source that has been giving rise to the succession of blobs in consecutive frames in order to revise an estimate of whether the source is flame or false alarm. The characteristic parameters of each blob undergoing analysis (each blob that has not already been classified as due to a false alarm source) is tracked across successive frames, as shown in FIG. 11. A point of inflection is found when the direction of the curve changes. In FIG. 11, it had been increasing from Frame n–5 through Frame n, but on Frame n it has decreased. Hence there is a point of inflection (in this case, a maximum) at Frame n. The point of inflection that has been found will always be in the previous frame, not the current frame. The previous point of inflection, at Frame n–6 in FIG. 11, would have been detected at Frame n–5. Once a point of inflection is detected in this manner, the distance (A/B ratio difference) between that point's A/B ratio and that of the previous inflection is found. The distance in time between the two points of inflection (frame difference) is also determined. In the example shown in FIG. 11, the frame difference is 5.

Figure 13:
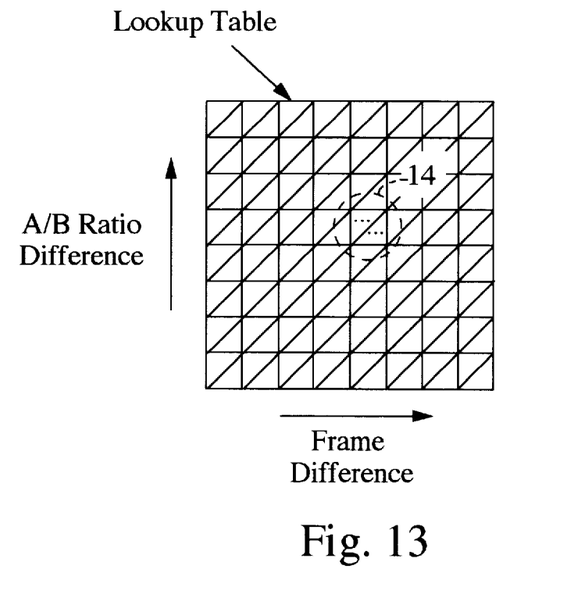
FIG. 13 shows an example entry in the flame/false-alarm database.
Figure 14:
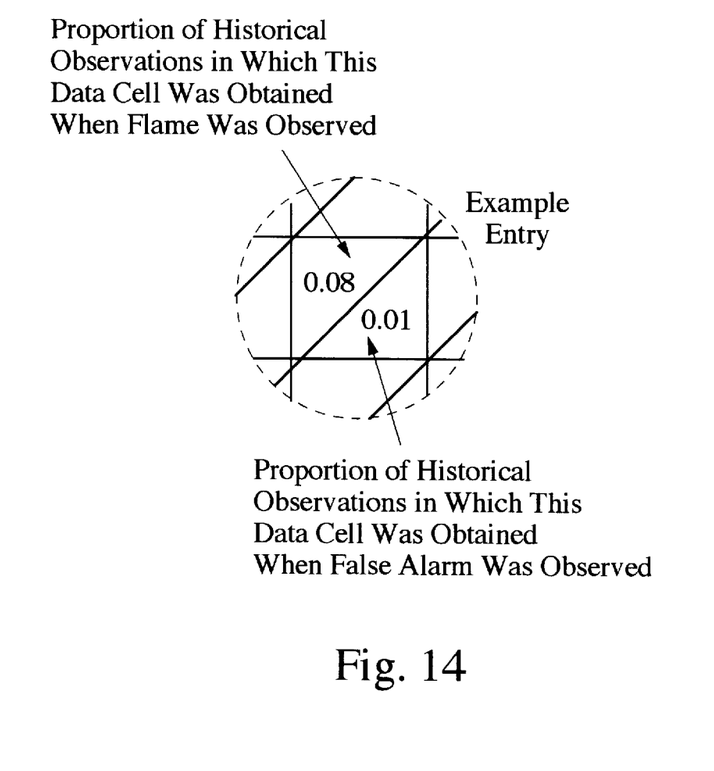
FIG. 14 is an enlarged view of the detail enclosed in phantom circle 14 of FIG. 13.

The A/B ratio difference and the frame difference between the two points are looked up (step 75A) in a database stored in database memory 110. The entries in the database are accessed through the A/B difference and the frame difference. Each entry contains two values, as shown in FIGS. 13-14; one is for flame and the other for false alarm. The values were obtained by processing images of known flame sources and known false-alarm sources with the system (analogous to calibrating the system with known flame and false-alarm sources), and electrically-programmed into a read-only memory (EPROM) chip; they are fixed, and not updated in any way as a result of use, in this exemplary embodiment. The fraction of all flame cases in which that entry was observed is one value, and the fraction of all false alarm cases in which that entry was observed is the other value. If the value for flame is greater than the value for false alarm, a vote for flame results. If the value for false alarm is greater than the value for flame, a vote for false alarm results. If they are equal, no vote results. If the entry has no values for either flame or false alarm, no vote results.

During surveillance, many votes are accumulated (step 75B) for each blob track as its points of inflection are examined. When the ratio of flame votes to total votes exceeds an empirically-determined threshold and the blob has been observed for more than an empirically-determined number of frames (step 75C), the decision making apparatus 75 generates (step 75F) an alarm signal sent to the actuator apparatus 80 for alarm activation and suppressant release. The vote condition may be expressed mathematically as:

[Σ flame votes]/[Σ flame votes+Σ false-alarm votes] >Flame threshold.

When the ratio of false alarm votes to total votes exceeds an empirically-determined threshold and a corresponding blob has been observed for more than an empirically determined number of frames (step 75D), the blob is marked as false alarm (step 75E). This vote condition may, again, be expressed mathematically as:

[Σ false-alarm votes]/[Σ flame votes+Σ false-alarm votes] >False-alarm threshold.

Exemplary Implementation of Pattern Recognition Apparatus

In an exemplary implementation, the pattern recognition apparatus 70 is implemented with an A/D converter apparatus 71 (Phillips SA 7110), a FPGA apparatus 72 (Actel, A1225XL)), two banks 112, 114 of video random access memory (VRAM) (Hitachi, HM63021), and one EPROM 110 (Fujitsu, MBM 28C256), as illustrated in FIG. 4. All the hardware for the pattern recognition apparatus 70 is available commercially. In this embodiment, the processing elements are implemented with three sections of the FPGA apparatus 72, which provides sufficient speed and flexibility for non-stop, continuous processing throughout surveillance. The first FPGA section 73 binarizes the output from the A/D converter apparatus 71 and finds the runs (if any) on each row of the frame. The data for each run are its row, the column in which it starts, and its length. These data are written successively to the VRAM 112, leaving space for the number of the blob to which the run will be assigned. Once a row has been processed, this FPGA apparatus section 73 signals the next FPGA section 74, which finds blobs.

The blob-finding section 74 examines the current row by reading successive run data from the VRAM 112. It adds runs from the current row to the set of blobs it is currently building. If there is no adjoining run for a given blob, that blob is complete. For example, in FIG. 8, there is no run on Row #7 to extend Blob A; the blob is now complete. When a run is found to extend a blob, as in the case of Run #14 on Row #8 extending Blob B, the blobfinding section writes that blob's number into the VRAM 114 at the run's reserved blob number location. In this case, it would be the number of Blob B. When a run is found that joins two previously unrelated blobs, such as Run #13 in FIG. 8, the blob numbers of all affected runs are updated by the blob finding section of the FPGA apparatus. When a run is found that is not attached to a blob, as in the case of Run #3 on Row #4, or Run #10 on Row #6, the next blob number is assigned to become the blob number for the run. Because the blob section 74 accesses only rows before the row currently being processed by the run-finding section 73, there is no conflict between the two processes that are independently and asynchronously writing to the run length data VRAM. Blob data, including the frame number on which the blob was first found, the MBR data, the A/B ratio and other data are written to the Blob Data VRAM by the blob-finding section 74.

Once a blob is complete, the blob-finding section 74 signals the flame evaluation section 75. The flame evaluation section 75 retrieves the necessary data from the blob data VRAM 114, calculates the frame difference and A/B ratio difference, looks up the entries in the A/B frequency database EPROM 110, re-evaluates the voting, and signals an alarm to the actuator apparatus 90 or updates the blob data VRAM 114 to mark the blob as non-flame when appropriate.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A flame detection system for detecting the presence of flame within an observed area while discriminating against false alarms, comprising:

infrared (IR) camera apparatus sensitive to energy in an infrared spectrum for producing infrared images of the observed area at a predetermined frame rate;

an optical apparatus for directing ambient spectral energy onto the camera apparatus, the optical apparatus including a wide field of view lens and a narrow band optical filter having a narrow passband centered in the near infrared spectrum, so that the spectral energy directed onto the IR camera apparatus is limited in its spectral content to the energy passed by the narrow band filter, thereby improving discrimination against false alarms due to background sources of infrared energy, said filter passband centered at 1140 nm and having a bandwidth which does not exceed about 50 nm for enhanced detection of flames and for suppression of background false alarm sources of infrared and ultraviolet energy outside its bandwidth;

pattern recognition apparatus responsive to the infrared images for discriminating flames from false alarms, the pattern recognition apparatus including:

feature extraction apparatus for determining blobs representing hot spots comprising each image, the feature extraction apparatus providing blob data regarding one or more features of the blobs;

decision apparatus for analyzing the blob data from the feature extraction apparatus to decide whether a blob is due to a flame or a false alarm, the decision apparatus updating the blob data continuously for an improved evaluation of whether a blob is due to a flame or a false alarm, the decision apparatus generating a flame detection signal indicating an alarm if the evaluation indicates a flame.

2. The flame detection system of claim 1 wherein the wide field of view lens has a field of view of at least 110 degrees.

3. The flame detection system of claim 1 wherein the wide field of view lens is fabricated of an optical material which passes only radiation in the visible and near infrared spectra.

4. The flame detection system of claim 1 wherein the IR camera apparatus includes a two-dimensional charge-coupled-device (CCD) array sensitive to near IR energy to reject background noise energy outside the near IR spectrum, and said system further includes analog-to-digital (A/D) converter apparatus for converting the analog signal of said array to digital form so that the signal level of each pixel is represented by a digital value, and wherein the pattern recognition apparatus includes binarizing apparatus for mapping each pixel value to a black value if the digital pixel value is below a threshold or otherwise to a white value, so that each image from the IR camera is represented by only black and white pixel values.

5. The system of claim 4 wherein said feature extraction apparatus includes apparatus for resolving the frame of binarized pixel data into blobs of adjacent white pixels.

6. The system of claim 4 wherien the CCD arry has sensitivety to inferared energy at 1140 nm sufficient to image flames, but which is insufficient to image background infrared sources emitting radiation at wavelengths longer than 1140 nm.

7. The system of claim 1 wherein the feature extraction apparatus further provides a predetermined parameter value describing each blob, wherein said parameter is an A/B ratio of the number of pixels in the blob to the number of pixels in the smallest upright rectangle which includes every pixel in the blob.

8. The flame detection system of claim 1 wherein said IR camera has sufficient sensitivity to capture images of flames at 1140 nm, and is without sufficient sensitivity to detect background sources emitting energy above 1140 nm.

9. The flame detection system of claim 1 wherein said narrow passband has a width of 17 nm.

10. A flame detection system for detecting the presence of flame within an observed area while discriminating against false alarms, comprising:
   infrared (IR) camera apparatus sensitive to energy in an infrared spectrum for producing infrared images of the observed area at a predetermined frame rate;
   pattern recognition apparatus responsive to the successive infrared images for producing flame detection signals, the pattern recognition apparatus including:
   feature extraction apparatus for finding and determining predetermined features of connected sets of pixels representing a hot area in an image, said features including an A/B ratio of the number of pixels in a hot area to the number of pixels in the smallest upright rectangle which includes every pixel in the hot area, an A/B ratio difference value representing the difference in A/B ratios between successive inflection points, and a frame difference value representing the time between the occurrences of said successive inflection points; and
   decision apparatus for analyzing the feature data from the feature extraction apparatus to decide whether a hot area is due to a flame or a false alarm, the decision apparatus employing updated feature data from images being constantly produced by the IR camera apparatus for an improved evaluation of whether a hot area is due to a flame or a false alarm, the decision apparatus generating a flame detection signal indicating an alarm if the evaluation indicates a fire.

11. The system of claim 10 wherein the decision apparatus applies feature data from the feature extraction apparatus in a decision algorithm to provide a likelihood of flame parameter value, the decision apparatus updating the flame parameter value as successive digital image representations are provided by the IR camera apparatus and comparing the flame parameter value for a given hot area to a threshold value, the decision apparatus generating a flame detection signal indicating an alarm if the flame parameter value exceeds the threshold value.

12. The flame detection system of claim 10 further comprising an optical apparatus for directing ambient spectral energy onto the IR camera apparatus, the optical apparatus including a wide field of view lens and a narrow band optical filter having a narrow passband centered in the near infrared spectrum, so that the spectral energy directed onto the IR camera apparatus is limited in its spectral content to the energy passed by the narrow band filter, thereby improving discrimination against false alarms due to background sources of infrared energy.

13. The flame detection system of claim 12 wherein the filter has a passband centered at 1140 nm, the passband having a bandwidth which does not exceed about 50 nm for enhanced detection of flames and for suppression of background false alarm sources of infrared and ultraviolet energy outside its bandwidth.

14. The flame detection system of claim 10 wherein the IR camera apparatus includes a two-dimensional charge-coupled-device (CCD) array sensitive to near IR energy to reject background noise energy outside the near IR spectrum, and said system further includes analog-to-digital (A/D) converter apparatus for converting the analog signal of said IR camera apparatus to digital form so that the signal level of each pixel is represented by a digital value, and wherein the pattern recognition apparatus includes binarizing apparatus for mapping each pixel value to a black value if the digital pixel value is below a threshold or otherwise to a white value, such that each image from the IR camera is represented by only black and white pixel values.

15. The system of claim 10 wherein said feature extraction apparatus further includes apparatus for resolving each frame of binarized pixel data into areas of adjacent white pixels.

16. The system of claim 10 wherein the IR camera apparatus includes a sensor array which has sensitivity to infrared energy at 1140 nm sufficient to image flames, but which is insufficient to image background infrared sources.

17. A method for detecting the presence of flame in an observed area while providing discrimination against false alarms, comprising the following steps:
   forming successive digitized images of the observed area at a frame rate, each image representing only a narrow band of spectral components of ambient energy within a near infrared spectrum;
   analyzing the digitized images to recognize blobs due to hot areas within the digitized images and extract features of the blobs;
   in successive images of the observed area, matching blobs and determining points of inflection of a predetermined measure of the blobs representing change of the blob feature as a function of time;
   using differences between adjacent points of inflection to determine a likelihood of flame parameter value;
   comparing the flame parameter value to a threshold value and setting a flame detection signal if the threshold is exceeded.

18. The method of claim 17 further comprising the steps of updating the parameter value for successive digital image representations, comparing the updated parameter value to the threshold value, and setting the flame detection signal if the threshold is exceeded.

19. The method of claim 17 wherein the predetermined measure is an A/B ratio of the number of pixels in a blob to the number of pixels in the smallest upright rectangle which includes every pixel in the blob.

20. The method of claim 19 wherein the step of using temporal changes in said parameter includes using differences in the A/B ratio values between points of inflection and a frame difference value representing the number of image frames between those points of inflection as data values for determining whether a blob indicates a flame or a false alarm.

21. The method of claim 20 wherein corresponding ones of said A/B ratio difference values and said frame difference value are respectively employed as address values to look up a corresponding database entry having two values, a first database value representing a probability of flame and a second database value representing a probability of false alarm.

22. The method of claim 21 wherein said first database values are predetermined values obtained by processing images of known flame sources, and said second database values are obtained from known false-alarm sources.

23. The method of claim 22 wherein each of said first database values represent the fraction of all flame cases in which the particular A/B ratio difference value and frame difference value was observed, and each of said second database values represent the fraction of all false alarm cases in which the particular A/B difference value and frame difference values are observed.

24. The method of claim 17 wherein the step of analyzing the digitized images includes binarizing each pixel of said digitized images to either a black or a white pixel value.

25. The method of claim 17 wherein the step of analyzing the digitized images includes the steps of processing successive rows of pixels comprising each digitized image to find runs of adjacent white pixels, and comparing runs in adjacent rows of pixels to find overlapping runs to be resolved into blobs.

26. A flame detection system for detecting the presence of flame within an observed area while discriminating against false alarms, comprising:

infrared (IR) camera apparatus sensitive to energy in an infrared spectrum for producing infrared images of the observed area at a predetermined frame rate;

an optical apparatus for directing ambient spectral energy onto the camera apparatus, the optical apparatus including a wide field of view lens and a narrow band optical filter having a narrow passband centered in the near infrared spectrum, so that the spectral energy directed onto the IR camera apparatus is limited in its spectral content to the energy passed by the narrow band filter, thereby improving discrimination against false alarms due to background sources of infrared energy;

pattern recognition apparatus responsive to the infrared images for discriminating flames from false alarms, the pattern recognition apparatus including:

feature extraction apparatus for determining blobs representing hot spots comprising each image, the feature extraction apparatus providing blob data regarding one or more features of the blobs, the feature extraction apparatus further adapted to provide a predetermined parameter value describing each blob, wherein said parameter is an A/B ratio of the number of pixels in the blob to the number of pixels in the smallest upright rectangle which includes every pixel in the blob, wherein the blob data from said feature extraction apparatus includes an A/B ratio difference value representing the difference in A/B ratios between successive inflection points, and a frame difference value representing the time between the occurrences of said successive inflection points;

decision apparatus for analyzing the blob data from the feature extraction apparatus to decide whether a blob is due to a flame or a false alarm, the decision apparatus updating the blob data continuously for an improved evaluation of whether a blob is due to a flame or a false alarm, the decision apparatus generating a flame detection signal indicating an alarm if the evaluation indicates a flame.

* * * * *